US010053219B2

(12) United States Patent
Braca et al.

(10) Patent No.: US 10,053,219 B2
(45) Date of Patent: Aug. 21, 2018

(54) DISPLACEMENT SYSTEM FOR A SEAT, IN PARTICULAR AN AIRPLANE SEAT

(71) Applicant: OPTIMARES S.P.A., Sezze Scalo (LT) (IT)

(72) Inventors: Alessandro Braca, Sezze Scalo (IT); Alessio Morsicani, Sezze Scalo (IT); Andrea Giordano, Sezze Scalo (IT)

(73) Assignee: OPTIMARES S.P.A., Sezze Scalo (LT) (IT)

( * ) Notice: Subject to any disclaimer, the term of this patent is extended or adjusted under 35 U.S.C. 154(b) by 245 days.

(21) Appl. No.: 14/945,402

(22) Filed: Nov. 18, 2015

(65) Prior Publication Data
US 2016/0144964 A1    May 26, 2016

(30) Foreign Application Priority Data

Nov. 20, 2014    (EP) .................................... 14425147

(51) Int. Cl.
*B64D 11/06* (2006.01)

(52) U.S. Cl.
CPC ........ *B64D 11/064* (2014.12); *B64D 11/0641* (2014.12); *B64D 11/0643* (2014.12)

(58) Field of Classification Search
CPC .............. B64D 11/064; B64D 11/0641; B64D 11/0643
USPC ................................................ 297/84, 354.13
See application file for complete search history.

(56) References Cited

U.S. PATENT DOCUMENTS

| 6,305,644 B1 | 10/2001 | Beroth |
| 6,393,641 B1 | 5/2002 | Hensley |
| 6,499,162 B1 * | 12/2002 | Lu ........................ A47C 20/041 5/616 |
| 7,318,625 B2 * | 1/2008 | Roither ................ A47C 20/041 297/354.13 |

(Continued)

FOREIGN PATENT DOCUMENTS

| EP | 1 234 763 A2 | 8/2002 |
| WO | WO 00/36952 A1 | 6/2000 |

OTHER PUBLICATIONS

European Search Report dated Apr. 29, 2015 for the European Patent Application No. 14425147.7.

*Primary Examiner* — Milton Nelson, Jr.
(74) *Attorney, Agent, or Firm* — Hershkovitz & Associates, PLLC; Abe Hershkovitz

(57) ABSTRACT

A displacement system for an airplane seat comprising a sitting portion, a backrest and a legrest, the displacement system comprising a support structure, a sitting portion structure connected to the support structure on a first plane (α), and a kinematic mechanism for displacement acts on at least the sitting portion structure to pass between a first sitting configuration and at least a second cradle configuration and vice versa, a surface of the sitting portion comprising at least a first back portion lying on the first plane (α), and a second front portion lying on a second plane (β), the portions being constrained in rotation with each other in passage between the first configuration to the second configuration, and vice versa, the kinematic mechanism for displacement being configured to act on the second portion so that, in different configurations, the second portion is inclined at different angles with respect to the first portion.

20 Claims, 3 Drawing Sheets

(56) References Cited

U.S. PATENT DOCUMENTS 8,955,178 B2 * 2/2015 Robertson ............ A47C 20/041
5/613
2014/0300161 A1 10/2014 Beroth

* cited by examiner

DISPLACEMENT SYSTEM FOR A SEAT, IN PARTICULAR AN AIRPLANE SEAT

FIELD OF THE INVENTION

The present invention concerns a displacement system for a seat, in particular an airplane seat.

More precisely, the present invention concerns a system which is capable of kinematic displacement of a seat between a sitting configuration, a cradle configuration and a bed or extended configuration, and vice versa.

BACKGROUND OF THE INVENTION

In the state of the art, airplane seats for business class flyers are developed in such a way as to respond to the needs of and provide better comfort for the passengers during long journeys. Such seats can generally assume both a raised or sitting position. The sitting portion of the seat is substantially parallel to the support plane of the seat, and the backrest is substantially perpendicular to the sitting portion. In a bed or extended configuration, the backrest is rotated in such a way to be positioned substantially on the same plane as the sitting portion, so as to form a bed.

Moreover, some seats of the prior art also are able to assume an intermediate configuration, between the sitting configuration and bed configuration, so that the sitting portion is inclined in such a way as to raise the front portion of the sitting portion with respect to the back portion of the sitting portion, and the backrest reclines with respect to the seat. Such a configuration is generally called a "cradle," and it allows the passenger to assume a position that is more relaxed, having the back laying down and the legs slightly raised.

However, from an ergonomic point of view, in the cradle configuration, the weight of the passenger tends to rest on the pelvis, and this entails, in the long run, postural pains.

Therefore, it is object of the present invention to solve postural problems arising during use of the cradle configuration of the prior art seats in such a way as to allow better sitting ergonomics of the passenger.

SUMMARY OF THE INVENTION

The present invention is directed to a displacement system for a seat, in particular an airplane seat, the seat comprising a sitting portion, a backrest and a legrest. The displacement system comprises a support structure for the support of the seat, a sitting portion structure for the support of a sitting portion of the seat, the sitting portion structure being connected to the support structure and comprising a sitting portion surface lying on at least a first plane. Displacement means act on at least the sitting portion structure in such a way that the displacement system causes the seat to pass between a first configuration or sitting configuration and at least a second configuration or cradle configuration, and vice versa. The sitting portion surface is subdivided into at least two sitting portions, a first portion or back portion, lying on a first plane, and a second portion or front portion, lying on a second plane, the portions being constrained in rotation with each other in the passage between the first configuration to the second configuration, and vice versa, the displacement means being configured to act on the second portion so that, in the first configuration the second plane is inclined with respect to the first plane by a first angle substantially of 180°, and in the second configuration, is inclined by a second angle positive and smaller than 180°.

Moreover, according to the invention, the displacement means can be configured to act on the second portion so that, in the second configuration, the second plane is inclined with respect to the first plane by a second angle between around +175° and +120°.

According to the invention, the first portion can have a depth that is substantially half of the second portion, in such a way as to ergonomically support, during use, the pelvis of a passenger.

Still according to the invention, the displacement means can be configured to act on the second portion so that the displacement system causes the seat to pass between the first configuration, the second configuration, and a third configuration or bed configuration, and the displacement means are configured so that, in the third configuration, the second plane is inclined with respect to the first plane by a third angle substantially equivalent to 180°.

Further according to the invention, the displacement means may comprise at least a lever, hinged in a first end in the support structure and in a second end in the second portion of the sitting portion surface.

Preferably according to the invention, the support structure also may comprise a fixed part, and a movable part that is movable with respect to the fixed part, the movable part being integrally connected to the first portion of the sitting portion surface, and the displacement means are configured to act on the movable part so that it moves in a front/back direction in the passage between the first configuration and the second configuration and vice versa.

In particular, according to the invention, the first plane whereon said first portion lies, in the passage between the first configuration and the at least a second configuration, and vice versa, may be constrained in a linear trajectory.

Moreover, according to the invention, the fixed part may comprise at least a first sliding guide and at least a second sliding guide, in that the movable part is adapted to slide in the at least a first sliding guide, and in that the first end of the lever is adapted to slide in the at least a second sliding guide.

More in particular, according to the invention, the first sliding guide may be a linear guide.

Still further according to the invention, the second sliding guide may be substantially shaped in the form of a "V" in such a way as to present a first portion sloping downwardly and a second portion sloping upwardly, to cause the tilting movement of the second portion.

Furthermore, according to the invention, the displacement system may comprise a backrest structure constrained in rotation to the first portion of the sitting portion surface, the backrest structure presenting a backrest surface for support, during use, of the back of a passenger, lying on a third plane, and the displacement means are configured in such a way as to act on the backrest structure so that, when the displacement system causes the seat to pass into the first configuration, the third plane is inclined with respect to the first plane by a fourth angle comprised between around +90° and +100°, and in the second configuration, it is inclined by a fifth angle comprised between around +95° and +120°.

Further according to the invention, the displacement means may be configured in such a way as to act on the backrest structure so that, when the displacement system causes the seat to pass into the third configuration, the third plane is inclined with respect to the first plane by a sixth angle equivalent to 180°.

Moreover according to the invention, the displacement system may further comprise a legrest structure constrained in rotation to the second portion of the sitting portion surface, the legrest structure presenting a legrest surface for supporting the legs of a passenger lying on a fourth plane, and the displacement means are configured in such a way as to act on the legrest structure so that, when the displacement system causes the seat to pass into the first configuration, the fourth plane is inclined with respect to the second plane by a seventh angle comprised between around −90° and 180°, and in the second configuration is inclined by a eighth angle comprised between around −90° and 180°.

Preferably according to the invention, the displacement means may be configured in such a way as to act on the legrest structure so that, when the displacement system causes the seat to pass into the third configuration, the fourth plane is inclined with respect to the second plane by a ninth angle of 180°.

Finally, according to the invention, the displacement means may comprise a variable length lever.

BRIEF DESCRIPTION OF THE DRAWINGS

The invention will be now described by way of illustration but not by way of limitation, with particular reference to the drawings of the enclosed Figures, wherein.

DETAILED DESCRIPTION OF THE INVENTION

Figure 1:
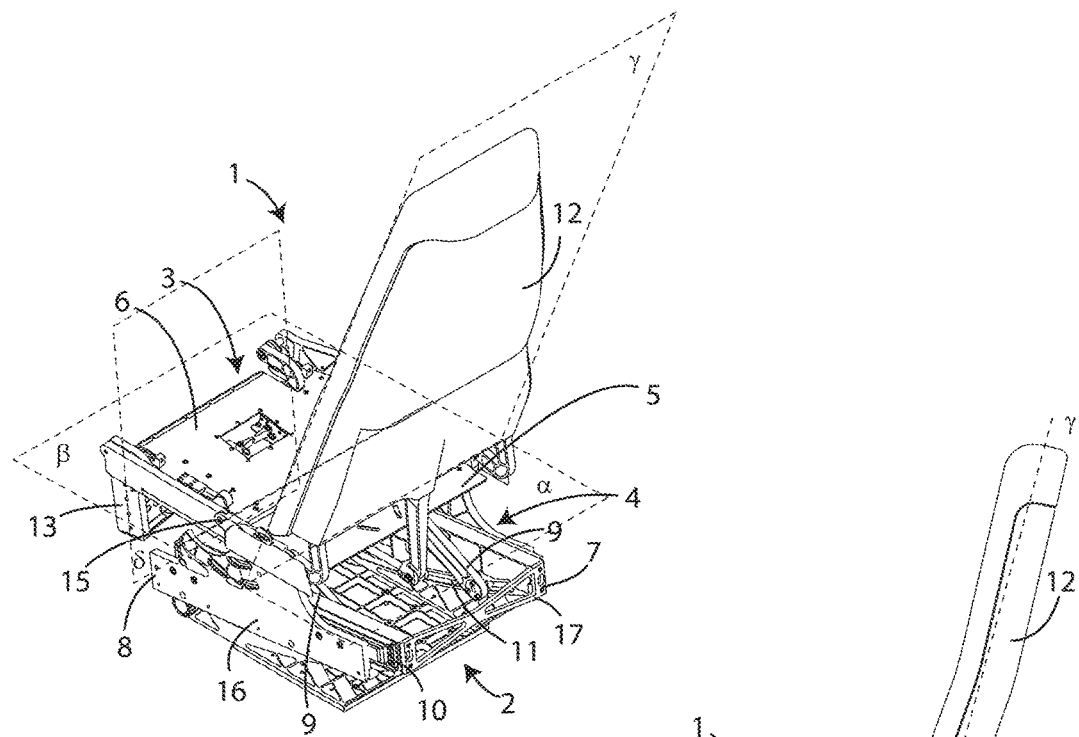
FIG. 1 shows a rear perspective view of a displacement system for a seat according to the invention in the sitting configuration.

Making reference to FIGS. 1-9, the displacement system for a seat, in particular an airplane seat, according to the invention, is indicated with the reference number 1.

It is clear that the present invention can be applied both to airplane seats and seats for other transportation means, such as for example trains, buses and ships, or to seats suitable to be utilized in waiting rooms of airports, stations or other locations without falling outside the scope of the present invention, where the main focus is in the improvement of the comfort of the user accommodated in the seat.

In the present disclosure, reference will be made to the back portion of the seat corresponding to the portion positioned in correspondence to the back of the passenger that is seated on the seat, the front portion of the seat corresponding to the portion positioned in correspondence to the legs of the passenger seated on the seat, and the lateral positions in correspondence to the arms of the passenger seated on the seat.

A seat normally comprises a sitting portion (seat), a backrest and a legrest. In the Figures, the displacement system 1 according to the invention is shown, comprising the support structures of each component of a seat and, in particular, a support structure 2 for the seat support, lying on a plane or support surface such as, for example, the floor of an airplane, a sitting portion structure 3 for the support of the sitting portion of the seat, a structure of the backrest 12, for the support of the backrest, and a structure of the legrest 13, for the support of the legrest of the seat.

The present invention mainly concerns the displacement and configuration of the sitting portion structure 3 and, secondarily, the displacement and configuration of the structures for backrest 12 and legrest 13. For ease of illustration, in the enclosed Figure a single embodiment will be shown, which comprises all these three features.

It is observed, in particular, that such a sitting portion structure 3, or sitting frame, is connected to the seat support structure 2 and presents a sitting portion surface, for support during use by a passenger. The sitting portion surface is subdivided into two portions 5 and 6. The first portion or back portion 5 lies on a first plane α and is adapted to support, during use, the pelvis of a passenger. The second portion or front portion 6 lies on a second plane β, and is adapted to support, during use, the upper part of the legs of a passenger.

Such portions 5 and 6 are connected with each other and constrained in rotation in correspondence to the respective lateral portions, in at least a pivot point 15.

Figure 2:
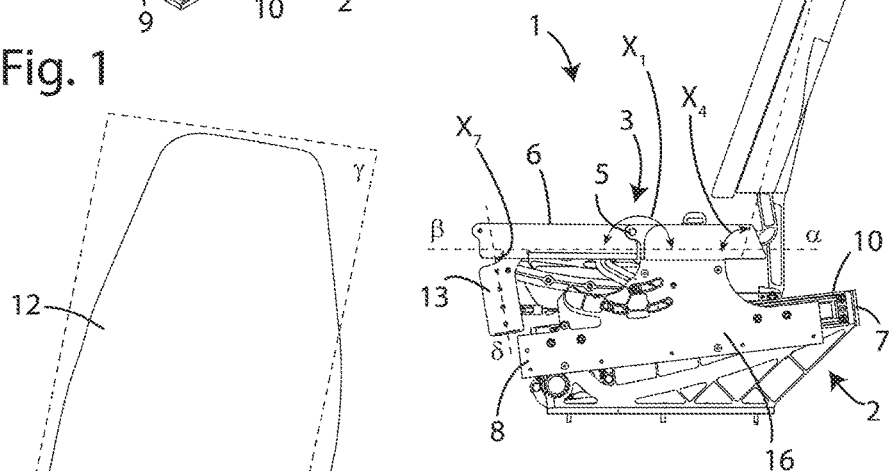
FIG. 2 shows a lateral view of the displacement system of FIG. 1.
Figure 3:
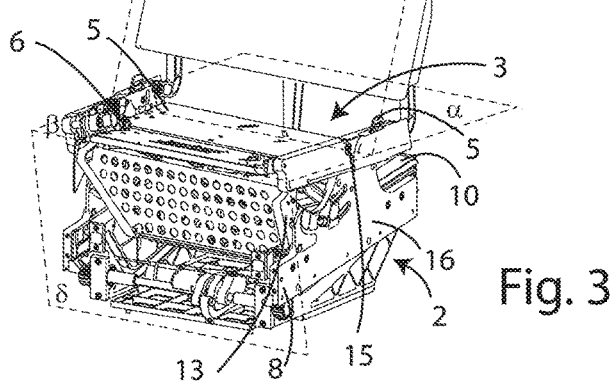
FIG. 3 shows a front perspective of the displacement system of FIG. 1.
Figure 4:
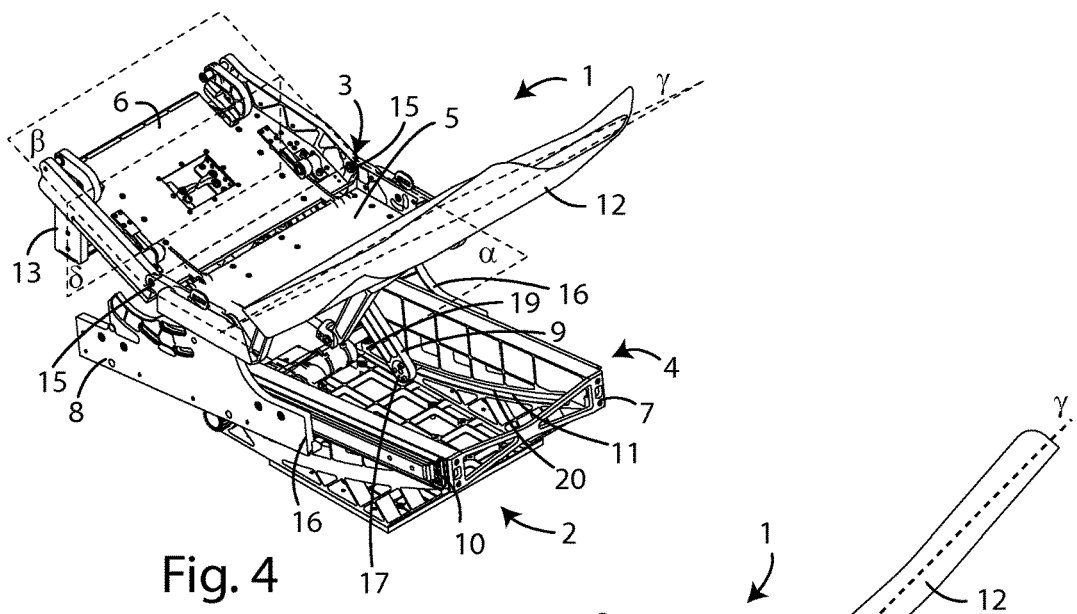
FIG. 4 shows a rear prospective view of the displacement system of FIG. 1 in the cradle configuration.
Figure 5:
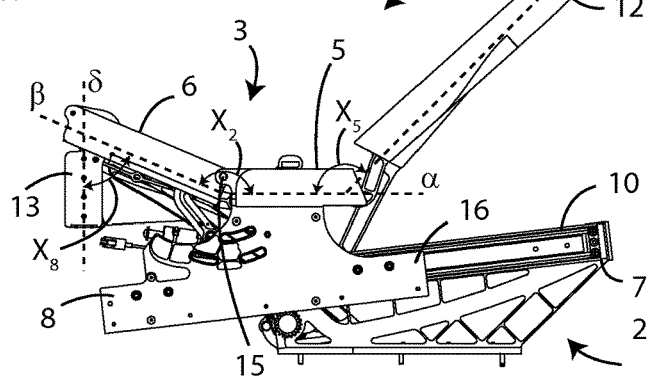
FIG. 5 shows a lateral view of the displacement system of FIG. 4.
Figure 6:
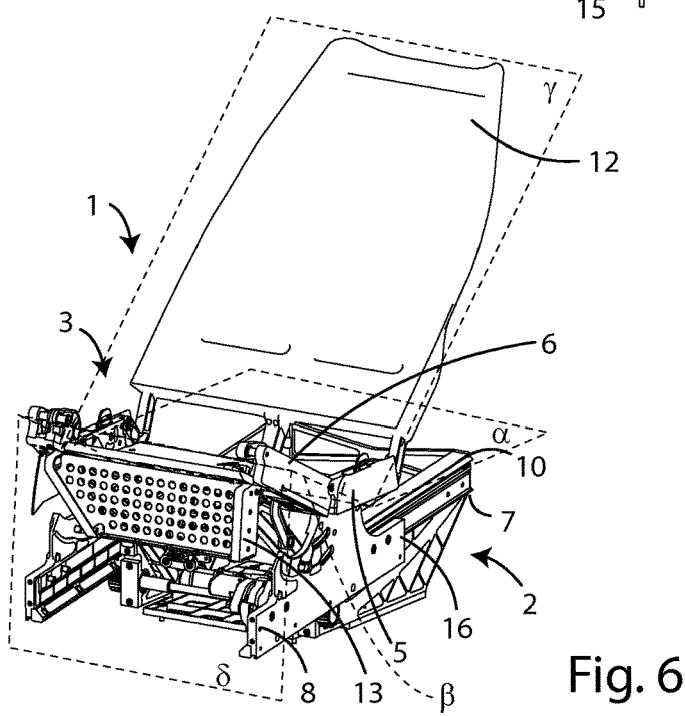
FIG. 6 shows a front perspective view of the displacement system of FIG. 4.

The displacement system 1 according to the invention further comprises displacement means 4 acting on at least the sitting portion structure 3 in such a way that the displacement system 1 causes the seat to pass from a first configuration or sitting configuration to at least a second configuration or cradle configuration, and vice versa. In particular, the displacement means 4 are configured to act on the front portion 6 so that, in the first configuration, the second plane β is inclined with respect to the first plane α by a first angle $x_1$ substantially of 180° (as shown in FIGS. 1-3), and in the second configuration, is inclined by a second angle $x_2$ positive and smaller than 180° (as shown in FIGS. 4-6). Preferably, the second angle $x_2$ is comprised between around +175° and +120°, so the front portion 6 is tilted.

It is to be noted that, for the indication of the angles, a circumference is conventionally considered, which is subdivided into an upper arch and a lower arch by a straight line formed by two planes, for example, the first plane α and the second plane β, inclined substantially at 180° with respect to each other. All the angles smaller than 180° and indicated with a positive sign find themselves in the upper conference arch, and all the angles smaller than 180° and indicated with a negative sign find themselves in the lower circumference arch.

This allows, advantageously, to adjust separately the inclination of the front portion 6 and the back portion 5 of the sitting portion surface, allowing better sitting portion ergonomics for the passenger, above all in the cradle configuration. Moreover, the displacement system according to the invention allows absorption of the electric actuators to be reduced, because the weight of the passenger does not rest directly on them.

For an optimal ergonomic support of the pelvis of a passenger, back portion 5 can present a depth that is substantially half of the depth of the front portion 6 of the sitting portion surface. Such depth proportion is particularly evident by the lateral views of the displacement system 1 according to the invention, as represented in FIGS. 2, 5 and 8.

Figure 7:
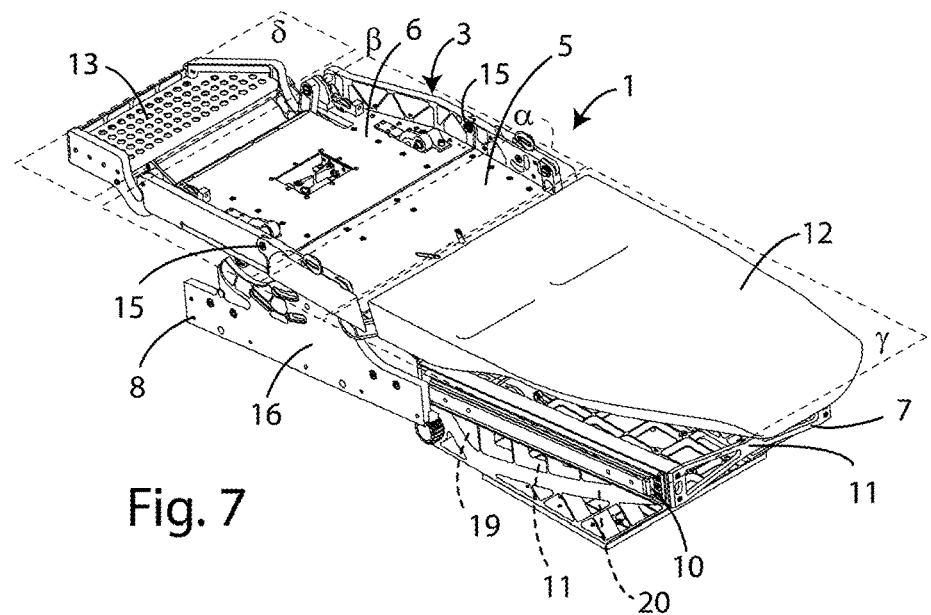
FIG. 7 shows a rear prospective view of the displacement system of FIG. 1 in the bed configuration.
Figure 8:
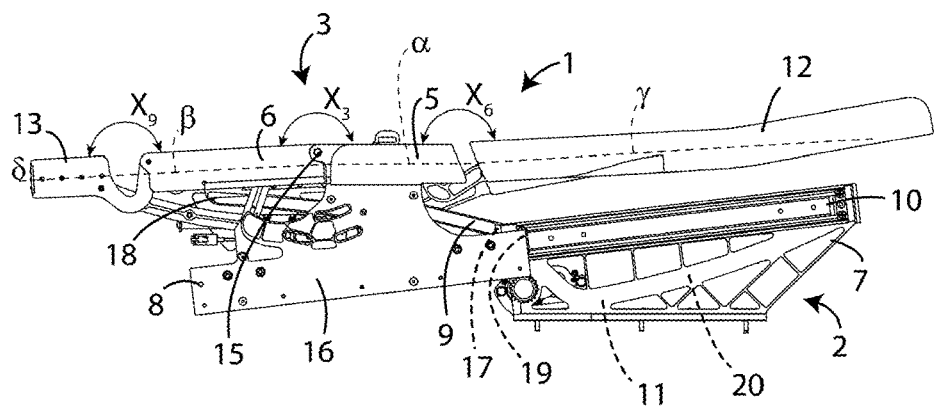
FIG. 8 shows a lateral view of the displacement system of FIG. 7.
Figure 9:
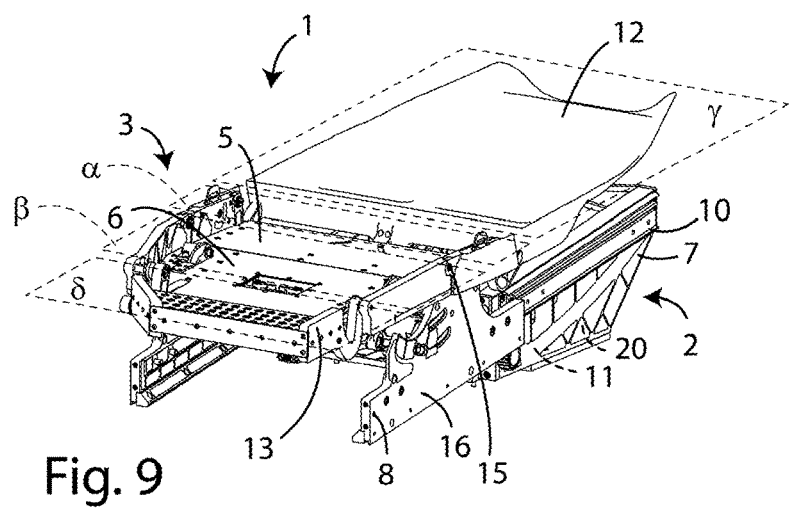
FIG. 9 shows a front prospective view of the displacement system of FIG. 7.

Still according to the present invention, the displacement means 4 can be configured in such a way to act directly on the front portion 6 so that the displacement system 1 is able to cause the seat to pass from the first configuration, and the second configuration, which becomes an intermediate configuration, into a third configuration or bed configuration, in such a way that, in the third configuration, the second plane β is inclined with respect to the first plane α by a third angle $x_3$ substantially equivalent to 180° (as shown in the FIGS. 7-9).

This advantageously allows the seat to be restored to a configuration wherein the two portions 5 and 6 are substantially coplanar for better comfort of a passenger when in the laying down position.

In the particular embodiment represented in the Figures, the displacement means 4 comprise two levers 9, in particular two milled elements, hinged at a first end 17 of each in the support structure 2, and at a second end 18 of each on the front portion 6 of the sitting portion surface. Such levers 9 find themselves in correspondence to the lateral portions 16 of the support structure 2. In other embodiments, only a single lever 9 can be provided.

Such levers 9 operate the kinematic mechanism of the rotation of the front portion 6 with respect to the back portion 5 by pivot point 15, and therefore cause a tilting movement of the front portion 6 with respect to the back portion 5. The control and operation of the levers 9 can be carried out mechanically by suitable lever mechanism, or electronically.

It is evident that equivalent kinematic mechanisms fall within the scope of the present invention.

Preferably, in the displacement system 1 according to the invention, the support structure 2 comprises a fixed part 7, fixed with respect to the support plane of the seat, and a movable part 8, movable with respect to the fixed part 7. Such movable part 8 is integrally connected to the back portion 5 of the sitting portion surface, so as to move back portion 5 together with the movable part 8 and dragging also the front part 6 connected to it, although constrained in rotation. Moreover, the displacement means 4 are configured to act on the movable part 8 so that it moves in a forward or backward direction in the passage between the first configuration (FIGS. 1-3) and the second configuration (FIGS. 4-6) and vice versa, and possibly also the third bed configuration (FIGS. 7-9).

In the embodiments shown in the Figures, a movement of the movable part 8 is shown, which is in the forward direction with respect to the fixed part 7. However, in other embodiments, such movement also can be opposite, i.e., in the backward direction, without thereby falling outside the scope of protection of the present invention.

Such movement allows the forward movement of the sitting portion structure 3 to decrease the dimensions of the seat when the backrest of the seat is inclined, for example in the cradle position, until assuming the bed position.

In the specific embodiments shown in the Figures, the fixed part 7 comprises two first sliding guides 10, preferably positioned on the external sides of the fixed part 7 of the support structure 2, and two second sliding guides 11, preferably positioned on the internal sides of the fixed part 7 of the support structure 2. Moreover, the movable part 8 has two lateral portions 16, each able to slide in the respective first sliding guide 10 of the fixed part 7. Levers 9, moreover, have the first end 17 of each hinged and suitable to slide in the respective second sliding guide 11 of the first fixed part 7.

This allows, advantageously, control at the same time of the forward-backward movement of the movable part 8, and therefore of the structure or sitting frame 3, with respect to the fixed part 7 of the support structure 2. This allows rotation of the front portion or tilting portion 6 of the sitting portion surface with respect to the back portion 5.

It is evident that, in further embodiments, only a single first 10 sliding guide and only a single second 11 sliding guide can be provided, in the case, for example, when only a single lever 9 is provided.

In particular, the displacement system 1 according to the invention can provide that the first plane α, whereon said back portion 5 of the sitting portion surface lies, in the passage between the first configuration and the second configuration, and vice versa, is constrained in a linear trajectory, so preferably, first plane α is always parallel to the plane of the support structure 2. This advantageously allows the pelvis of the passenger to always be maintained in the same ergonomic position, and to vary the inclination of only second plane β, whereon the front or tilting portion 6 of the sitting portion surface lies.

Such a solution can be obtained by using, preferably, a linear sliding guide 10 as it is shown in the Figures in the present disclosure.

Further, the displacement system 1 according to the invention can have the second sliding guides 11 shaped substantially in the form of a "V" in such a way as to have a first back portion 20 sloping down downwards and a second front portion 19 sloping down upwards (for example, as seen in FIG. 4). This advantageously allows the tilting movement of the sitting portion structure 3 to be obtained in the cradle configuration, and at the same time, to constrain the sliding movement of the lever 9.

As anticipated, the displacement system 1 according to the present invention can further comprise both the structure of a backrest 12 and the structure of a legrest 13, or only one of them, connected to the main kinematic mechanism.

In particular, the backrest structure 12 is constrained in rotation to the back portion 6 of the sitting portion surface and has a backrest surface, for the support, during use, of the back of a passenger lying on a third plane γ. The displacement means 4 can therefore be configured in such a way as to act on the backrest structure 12 so that, when the displacement system 1 causes the seat to move into the first configuration, the third plane γ is inclined with respect to the first plane α by a fourth angle $x_4$ comprised between around +90° and +100° (as shown in the FIGS. 1-3), and in the second configuration, is inclined by a fifth angle $x_5$ comprised between around +95° and +120° (as shown in the FIGS. 4-6).

This allows optimal ergonomic support of the back of the passenger to be obtained, and at the same time, an optimal ergonomic posture.

Moreover, if the third or bed configuration is also provided, the displacement means 4 can be configured in such a way as to act on the backrest structure 12 so that, when the displacement system 1 causes the seat to pass into the third configuration, the third plane γ is inclined with respect to the first plane α by a sixth angle $x_6$ equivalent to 180° (as shown in the FIGS. 7-9).

In case a legrest structure 13 also is provided, it is constrained in rotation to the front portion 6 of the sitting portion surface, and presents a legrest surface to support the legs of a passenger lying on a fourth plane δ. The displacement means 4 are configured to act on the legrest structure 13 so that, when the displacement system 1 causes the seat to pass into the first configuration, the fourth plane δ is inclined with respect to the second plane β by a seventh angle $x_7$ comprised between around −90° and +180° (as shown in the FIGS. 1-3), and in the second configuration, is inclined by an eighth angle $x_8$ comprised between around −90° and +180° (as shown in the FIGS. 4-6).

Moreover, if the third or bed configuration is provided as well, the displacement means 4 can be configured in such a way as to act on the legrest structure 13 so that, when the displacement system 1 causes the seat to pass into the third configuration, the fourth plane δ is inclined with respect to the second plane β by a ninth angle $x_9$ of 180° (as shown in the FIGS. 7-9).

Furthermore, the displacement system 1 according to the invention, in a preferred embodiment, can provide displacement means 4 comprising a lever having a variable length that is connected to the movement of opening/closure of the legrest structure 13.

In the foregoing, preferred embodiments have been described and variations of the present invention have been suggested, but it is to be understood that those skilled in the art will make changes and modifications without thereby falling outside the relevant scope of protection, as defined by the enclosed claims.

The invention claimed is:

1. A displacement system for a seat, said seat comprising a sitting portion, a backrest and a legrest, said displacement system comprising a support structure for supporting said seat, a sitting portion structure for supporting said sitting portion, said sitting portion structure being connected to said support structure and comprising a sitting portion surface lying on at least a first plane (α), a kinematic displacement mechanism acting on at least said sitting portion structure to cause said seat to pass between a first, sitting configuration and at least a second, cradle configuration and vice versa, wherein said sitting portion surface is subdivided into at least two sitting portions, a first, back portion lying on said first plane (α), and a second, front portion lying on a second plane (β), said first and second portions being constrained in rotation with each other in passage between said first configuration and said second configuration, and vice versa, said kinematic displacement mechanism being configured to act on said second portion so that, in said first configuration, said second plane (β) is inclined with respect to said first plane (α) by a first angle of substantially 180°, and in said second configuration, is inclined by a second angle smaller than 180°.

2. The displacement system according to claim 1, wherein said kinematic displacement mechanism acts on said second portion so that, in said second configuration, said second plane (β) is inclined with respect to said first plane (α) by said second angle ($x_2$) comprised between approximately +175° and +120°.

3. The displacement system according to claim 1, wherein said first portion has a depth that is substantially half of said second portion, to ergonomically support, during use, a pelvis of a user of the seat.

4. The displacement system according to claim 1, wherein said kinematic displacement mechanism acts on said second portion so that said displacement system causes the seat to pass between said first configuration, said second configuration, and a third, bed configuration, wherein said second plane (β) is inclined with respect to said first plane (α) by a third angle ($x_3$) substantially equivalent to 180°.

5. The displacement system according to claim 1, wherein said kinematic displacement mechanism for comprises at least a lever hinged at a first end in said support structure and at a second end in said second portion of said sitting portion surface.

6. The displacement system according to claim 1, wherein said support structure comprises a fixed part and a movable part that is movable with respect to said fixed part, said movable part being integrally connected to said first portion of said sitting portion surface, and said kinematic displacement mechanism for acts on said movable part so that it moves in a front/back direction in passage between said first configuration and said second configuration, and vice versa.

7. The displacement system according to claim 6, wherein said fixed part comprises at least a first sliding guide and at least a second sliding guide, said movable part being slidable in said first sliding guide, and a first end of a lever being slidable in said second sliding guide.

8. The displacement system according to claim 7, wherein said second sliding guide is substantially shaped in the form of a "V" to present a first portion sloping downwardly and a second portion sloping upwardly to cause a tilting movement of said second portion.

9. The displacement system according to claim 1, wherein said first plane (α) whereon said first portion lies, in passage between said first configuration and said second configuration, and vice versa, is constrained in a linear trajectory.

10. The displacement system according to claim 9, wherein a fixed part of the support structure comprises at least a first sliding guide and at least a second sliding guide, said movable part of the support structure being slidable in said first sliding guide, and a first end of a lever being slidable in said second sliding guide.

11. The displacement system according to claim 10, wherein said second sliding guide is substantially shaped in the form of a "V" to present a first portion sloping downwardly and a second portion sloping upwardly to cause a tilting movement of said second portion.

12. The displacement system according to claim 10, wherein said first sliding guide is a linear guide.

13. The displacement system (1) according to claim 12, wherein said second sliding guide is substantially shaped in the form of a "V" to present a first portion sloping downwardly and a second portion sloping upwardly to cause a tilting movement of said second portion.

14. The displacement system according to claim 1, further comprising a backrest structure constrained in rotation to said first portion of said sitting portion surface, said backrest structure presenting a backrest surface for support during use by a back of a user lying on a third plane (γ), said kinematic displacement mechanism acting on said backrest structure so that, when said displacement system causes said seat to pass into said first configuration, said third plane (γ) is inclined with respect to said first plane (α) by a fourth angle ($x_4$) comprised between approximately +90° and +100°, and in said second configuration it is inclined by a fifth angle ($x_5$) comprised between approximately +95° and +120°.

15. The displacement system according to claim 14, wherein said kinematic displacement mechanism comprises a variable length lever.

16. The displacement system according to claim 14, wherein said kinematic displacement mechanism acts on said backrest structure so that, when said displacement system causes said seat to pass into said third configuration, said third plane (γ) is inclined with respect to said first plane (α) by a sixth angle ($x_6$) equivalent to 180°.

17. The displacement system according to claim 16, wherein said kinematic displacement mechanism comprises a variable length lever.

18. The displacement system according to claim 1, further comprising a legrest structure constrained in rotation to said second portion of said sitting portion surface, said legrest structure presenting a legrest surface for supporting the legs of a user, lying on a fourth plane (δ), and said kinematic displacement mechanism acts on said legrest structure so that, when said displacement system causes said seat to pass into said first configuration, said fourth plane (δ) is inclined with respect to said second plane (β) by a seventh angle ($x_7$) comprised between approximately −90° and 180°, and in said second configuration, is inclined by a eighth angle ($x_8$) comprised between approximately −90° and 180°.

19. The displacement system according to claim 18, wherein said kinematic displacement mechanism acts on said legrest structure so that, when said displacement system causes said seat to pass into said third configuration, said fourth plane (δ) is inclined with respect to said second plane (β) by a ninth angle ($x_9$) equivalent to 180°.

20. The displacement system according to claim 18, wherein said kinematic displacement mechanism comprises a variable length lever.

\* \* \* \* \*